United States Patent [19]

Lewis

[11] 3,715,815
[45] Feb. 13, 1973

[54] LEARNING CENTER
[76] Inventor: Robert B. Lewis, P. O. Box 2190, Aspen, Colo. 81611
[22] Filed: July 31, 1970
[21] Appl. No.: 60,027

[52] U.S. Cl. .........................35/60, 312/196, 108/94
[51] Int. Cl. ...............................................A47b 41/04
[58] Field of Search...........108/94, 95, 103, 104, 105, 108/139; 211/78, 144; 35/10, 60; D44/10; 220/22; 312/196

[56] References Cited

UNITED STATES PATENTS

| 694,124 | 2/1902 | Winter | 108/94 X |
| 844,754 | 2/1907 | Sardou | 108/105 |
| 948,434 | 2/1910 | Scott | 220/22 |
| 1,066,652 | 7/1913 | Raaen | 108/94 |
| 1,466,191 | 8/1923 | Roos | 108/95 |
| D171,849 | 3/1954 | Fulton | D44/10 |
| 3,245,545 | 4/1966 | Lortie | 108/104 X |

FOREIGN PATENTS OR APPLICATIONS 792,493   3/1958   Great Britain........................211/144

Primary Examiner—Harland S. Skogquist
Attorney—Hume, Clement, Hume and Lee

[57] ABSTRACT

A learning center for pre-school children comprising a worktable having attached perpendicularly to one face a supporting rod having arranged thereon a plurality of turntables and a plurality of display boards. The turntables, aligned parallel to the worktable, are free to revolve independently of one another in a clockwise or counter-clockwise direction about the supporting rod. The display boards can be constructed to revolve in conjunction with the turntables or to remain stationary. Attached at the outer periphery of each turntable are a plurality of containers spaced equidistant from each other and free to rotate about their axis. The containers are divided into multiple compartments so that a variety of materials can be contained therein. A display table is attached at the top of the learning center above the turntables and display boards.

1 Claim, 2 Drawing Figures

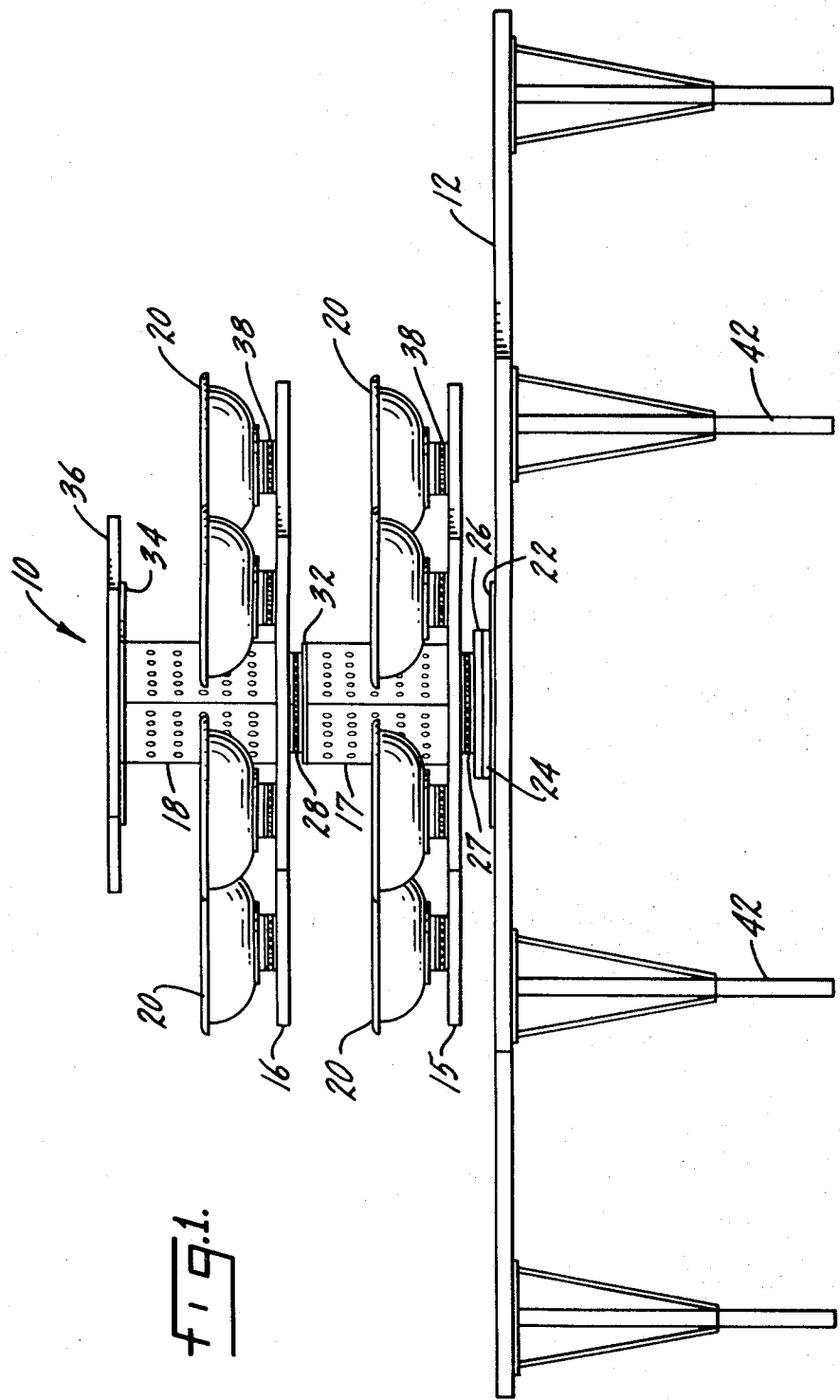

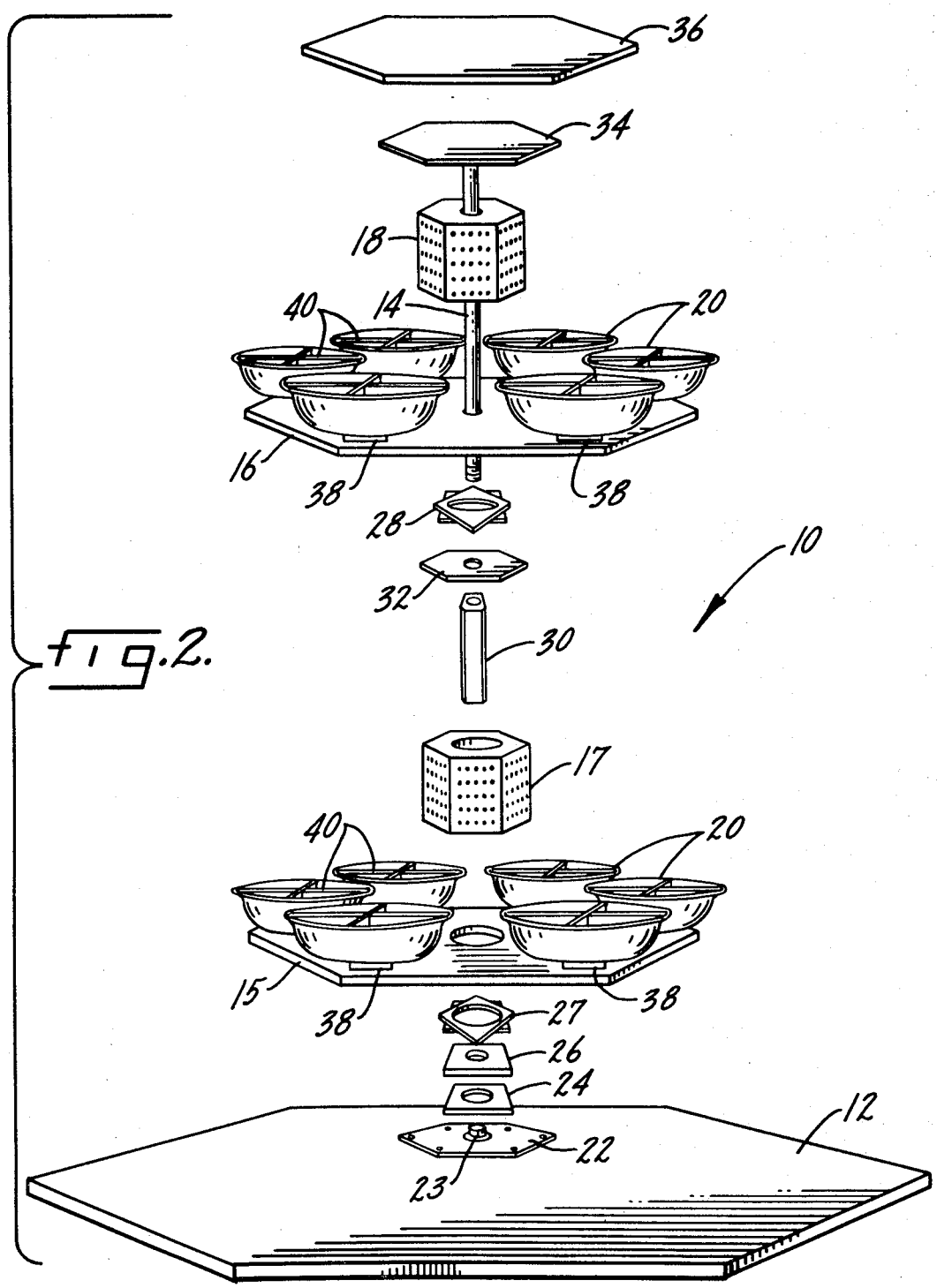

LEARNING CENTER

This invention relates to teaching devices and, more particularly, to a learning center for pre-school children, wherein the device enables such youngsters to have access to a variety of materials without leaving their seats.

Briefly, in accordance with the preferred embodiment of the invention, there is provided a learning center comprising a worktable having a supporting rod attached perpendicularly thereto. Arranged on the supporting rod are a pair of turntables and a pair of display boards. The turntables, aligned parallel to the worktable, are free to revolve independently of one another in a clockwise or counter-clockwise direction about the supporting rod. The display boards can be constructed to revolve in conjunction with the turntables or to remain stationary. Attached at the outer periphery of each turntable are a plurality of containers spaced equidistant from each other and free to rotate in a clockwise or counter-clockwise direction about their axis. The containers are divided into multiple compartments, preferably quadrants, so that a variety of materials can be contained therein. Thus, persons seated at the worktable may, by rotating the containers and revolving the turntables, have access to a multitude of different items placed within the containers without leaving their seats. Positioned on the top of the learning center is a display table where completed works may be placed.

FIG. 1 is an exploded view of the learning center embodying the features of this invention;

FIG. 2 is a side elevational view of the learning center.

Referring now to the drawings, there is illustrated a learning center embodying the preferred features of the present invention and indicated generally by reference numeral 10. The learning center 10 includes a worktable 12 and a supporting rod 14 attached perpendicularly to the top face of the worktable 12. The supporting rod 14 laterally supports two turntables 15 and 16 and two display boards 17 and 18. The turntables 15 and 16 are free to revolve independently of one another in a clockwise or counter-clockwise direction about the supporting rod 14 and have attached to their outer periphery a plurality of containers 20. In the preferred embodiment there are six containers 20 attached to each of the turntables 15 and 16, each container 20 being free to rotate in a clockwise or counter-clockwise direction about its axis so that a person seated at the worktable 12 could, by revolving the turntable 16 and rotating the containers 20, have access to a multitude of different items placed within the containers 20 without leaving his seat. A display table 36 is secured to the top end of the supporting rod 14.

Considering now the learning center 10 in more detail, and referring to the drawings, the learning center 10 includes a worktable 12, preferably of hexagonal shape, having a supporting rod 14 perpendicularly positioned in the center of its top face. The supporting rod 14 is secured in this position by attaching it to a baseplate 22 which is secured to the worktable 12. Attachment is accomplished by having one end of the supporting rod 14 threaded so that it can be turned into an internally threaded portion 23 formed on the baseplate 22.

In the preferred embodiment of the invention, the supporting rod 14 laterally supports a pair of hexagonal turntables 15 and 16 and a pair of hexagonal display boards 17 and 18. The display boards 17 and 18 may be made of any suitable material, such as pegboard or cork, to allow convenient attachment of materials thereto. The turntables 15 and 16 have circular openings at their centers to allow them to be positioned on the supporting rod 14 parallel to the worktable 12. The woodblocks 24 and 26 and a bearing 27 support the turntable 15 above the worktable 12. The woodblocks 24 and 26 and the bearing 27 are secured together, such as by gluing, each having centrally located circular openings which are aligned when they are positioned on the supporting rod 14. The woodblock 24 is secured to the baseplate 22 and has a larger circular opening than woodblock 26 to facilitate positioning over the portion 23. The bearing 27 is secured to the turntable 15 so that the turntable 15 is free to revolve in a clockwise or counter-clockwise direction about the supporting rod 14. The display board 17 is positioned on the supporting rod 14 above the turntable 15. The display board 17, the turntable 15 and the bearing 27, each have circular openings of the same size which are aligned when each member is in its proper position. A tubular shaft 30, of sufficient diameter and length to give lateral support to the display board 17, the turntable 15 and the bearing 27 has a circular opening which allows it to be positioned over the supporting rod 14 and inserted between the display board 17, the turntable 15 and the bearing 27 and to have one end secured to the woodblock 26. A woodblock 32, preferably of the same hexagonal shape and size as the top face of the display board 17, is positioned on the supporting rod 14 and fastened to the other end of the support 30. The display board 17 may be attached to the woodblock 32 or to the turntable 15 depending on whether it is desired to have the display board 17 remain stationary or revolve about the supporting rod 14 in conjunction with the turntable 15.

The turntable 16 is positioned on the supporting rod 14 above the woodblock 32 and is supported by and fastened to the bearing 28 which is also positioned on the supporting rod 14. The bearing 28 is secured to the woodblock 32 and permits the turntable 16 to revolve independently of the turntable 15 in a clockwise or counter-clockwise direction about the supporting rod 14. The display board 18 has a smaller circular opening than the display board 17 to closely fit around the supporting rod 14 laterally supporting it above the turntable 16. An upper baseplate 34, preferably of hexagonal shape, is fastened to the free end of the supporting rod 14. The display board 18 may be fastened to the baseplate 34 or to the turntable 16, depending upon whether it is desired for the display board 18 to remain stationary or to revolve about the supporting rod 14 in conjunction with the turntable 16. A display table 36, also preferably of hexagonal shape but larger than the upper baseplate 34, is secured to the baseplate 34 so as to be parallel to the worktable 12.

In the preferred embodiment, the turntables 15 and 16 have attached at each of their six corners a bowl-shaped container 20. Each container 20 is attached to the turntables 15 and 16 by a bearing 38 so that it may be rotated in a clockwise or counter-clockwise direction about its axis. The bearing 38 is identical in structure to the bearings 27 and 28 but is of a smaller size.

Dividers 40 separate each of the containers 20 into quadrants and are shaped so as to conform to the bowl-shaped walls of the containers 20.

The learning center 10 may, if desired, have any number of turntables and pegboards rather than the preferred pair illustrated in the drawings. The learning center 10 may also be supported by supporting legs 42, as shown in FIG. 1, or may be positioned on any table.

It will be understood that changes may be made in the details of construction, arrangement and operation without departing from the spirit of the claims.

We claim:

1. A learning center comprising:
    a. a nonrotatable worktable having supporting means and an upper work surface providing working space thereon for a plurality of students disposed around the periphery thereof;
    b. a support mounted on said table and extending vertically upwardly from the central portion thereof;
    c. a display table of substantially smaller cross-dimension than said worktable mounted at the top of said support and held nonrotatably with respect to said worktable and with its upper surface disposed in a plane parallel to the upper surface of said worktable;
    d. a plurality of turntables mounted for both clockwise and counter-clockwise rotation on said central support in vertically spaced relationship to each other and to said worktable and said display table and between the upper surface of said worktable and said display table;
    e. each of said turntables being of substantially smaller cross-dimension than said worktable but of larger cross-dimension than said display table;
    f. each turntable adjacent the periphery thereof having mounted thereon for both clockwise and counterclockwise rotation a plurality of containers each spaced peripherally from its neighbor;
    g. display boards disposed between the display table and adjacent turntable and display boards disposed between adjacent turntables; and
    h. said turntables and their associated containers being so dimensioned and disposed with respect to said worktable as to provide a work area for students on the surface of said worktable adjacent the periphery thereof, while providing for each student ready access to each of said turntables and to the contents of each of said containers, respectively.

* * * * *